(12) United States Patent
Beelen et al.

(10) Patent No.: US 10,589,607 B2
(45) Date of Patent: Mar. 17, 2020

(54) OPEN ROOF CONSTRUCTION FOR A VEHICLE

(71) Applicant: INALFA ROOF SYSTEMS GROUP B.V., Oostrum (NL)

(72) Inventors: Dennis Marie Petra Beelen, Weert (NL); Rainer Gerhart Jüngling, Monchengladbach (DE); Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 19 days.

(21) Appl. No.: 16/172,040

(22) Filed: Oct. 26, 2018

(65) Prior Publication Data
US 2019/0126733 A1 May 2, 2019

(30) Foreign Application Priority Data

Oct. 31, 2017 (EP) .................................... 17199374

(51) Int. Cl.
| | |
|---|---|
| *B60J 7/043* | (2006.01) |
| *B60J 7/057* | (2006.01) |
| *B60J 7/02* | (2006.01) |
| *B60J 7/047* | (2006.01) |

(52) U.S. Cl.
CPC ............... *B60J 7/043* (2013.01); *B60J 7/024* (2013.01); *B60J 7/047* (2013.01); *B60J 7/0435* (2013.01); *B60J 7/057* (2013.01)

(58) Field of Classification Search
CPC . B60J 7/043; B60J 7/0435; B60J 7/057; B60J 7/0573; B60J 7/024
USPC ................................ 296/216.03, 216, 5, 223
See application file for complete search history.

(56) References Cited

U.S. PATENT DOCUMENTS

| | | | |
|---|---|---|---|
| 4,407,541 A | 10/1983 | Boots | |
| 4,601,512 A | 7/1986 | Boots | |
| 4,647,106 A | 3/1987 | Furst | |
| 4,678,228 A | 7/1987 | Boots | |

(Continued)

FOREIGN PATENT DOCUMENTS

| | | |
|---|---|---|
| DE | 3536184 C1 | 11/1986 |
| DE | 3532111 A1 | 3/1987 |

(Continued)

OTHER PUBLICATIONS

European Search Report, dated May 7, 2018 for corresponding European Patent Application No. 17199374.4, filed Oct. 31, 3017.

*Primary Examiner* — Dennis H Pedder
(74) *Attorney, Agent, or Firm* — Steven M. Koehler; Westman, Champlin & Koehler, P.A.

(57) ABSTRACT

An open roof construction includes a roof opening in a stationary roof part and a panel that is movable between an open and closed positions. A moving mechanism moves a rear end of the panel and comprises a support lever having a first end which is slidable and rotatable with respect to the stationary roof part and an opposite second end slidably and rotatably engaging the movable panel. A drive slides the first end along the stationary roof part, and a tilting lever has a first tilting lever end slidably and rotatably engaging a first guide curve of the stationary roof part and an opposite second tilting lever end configured to rotatably engage the support lever at an engagement location. In all positions of the movable panel the engagement location, as viewed in the longitudinal forward direction of the vehicle, is located in front of the second support lever end.

19 Claims, 8 Drawing Sheets

(56) References Cited

U.S. PATENT DOCUMENTS

| | | | |
|---|---|---|---|
| 4,877,285 | A | 10/1989 | Huyer |
| 4,995,667 | A | 2/1991 | Tamura et al. |
| 5,028,090 | A | 7/1991 | Huyer |
| 5,058,947 | A | 10/1991 | Huyer |
| 5,092,651 | A | 3/1992 | Baldwin et al. |
| 5,238,290 | A | 8/1993 | Farmont |
| 5,288,125 | A | 2/1994 | Huyer |
| 5,618,081 | A | 4/1997 | Nabuurs |
| 5,765,907 | A | 6/1998 | Nabuurs |
| 6,174,024 | B1 | 1/2001 | Kronseder et al. |
| 8,182,029 | B2 | 5/2012 | Van Boxtel et al. |
| 2010/0314913 | A1 | 12/2010 | Van Boxtel et al. |

FOREIGN PATENT DOCUMENTS

| | | | |
|---|---|---|---|
| DE | 4101288 | A1 | 7/1991 |
| DE | 102005059285 | A1 | 6/2007 |
| DE | 202010012974 | U1 | 2/2012 |
| EP | 0187398 | A1 | 7/1986 |
| EP | 0292730 | A2 | 11/1988 |
| EP | 0296644 | A2 | 12/1988 |
| EP | 0343750 | A1 | 11/1989 |
| EP | 0373692 | A2 | 6/1990 |
| EP | 0437283 | A1 | 7/1991 |
| EP | 0543427 | A1 | 5/1993 |
| EP | 0657316 | A1 | 6/1995 |
| EP | 1741588 | A1 | 1/2007 |
| EP | 2263897 | A1 | 12/2010 |
| GB | 2078295 | A | 1/1982 |
| GB | 2114212 | A | 8/1983 |
| GB | 2122143 | A | 1/1984 |
| GB | 2140500 | A | 11/1984 |

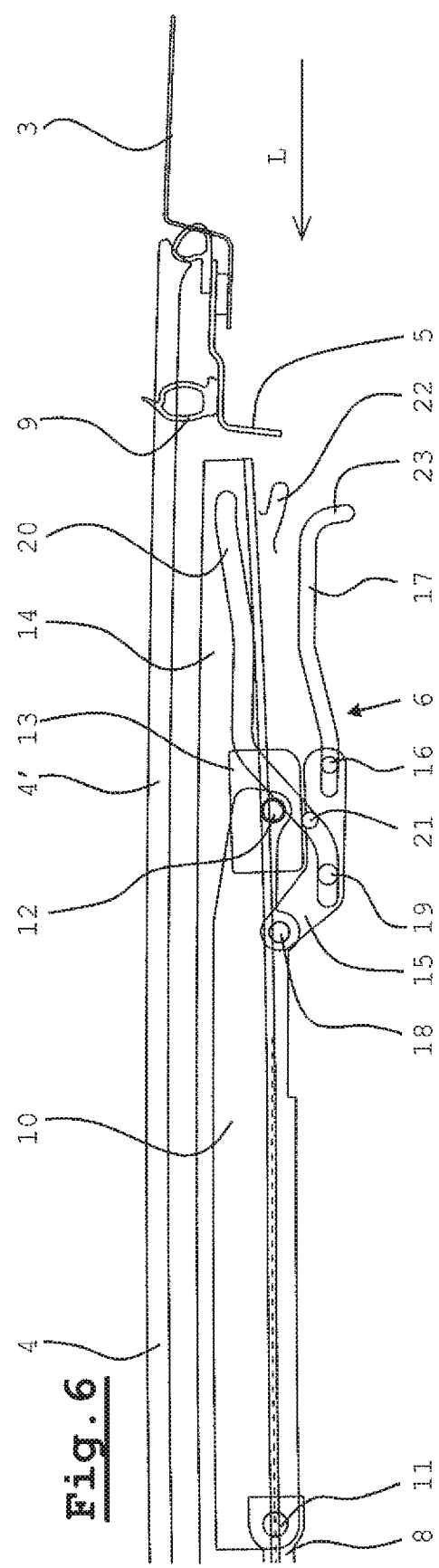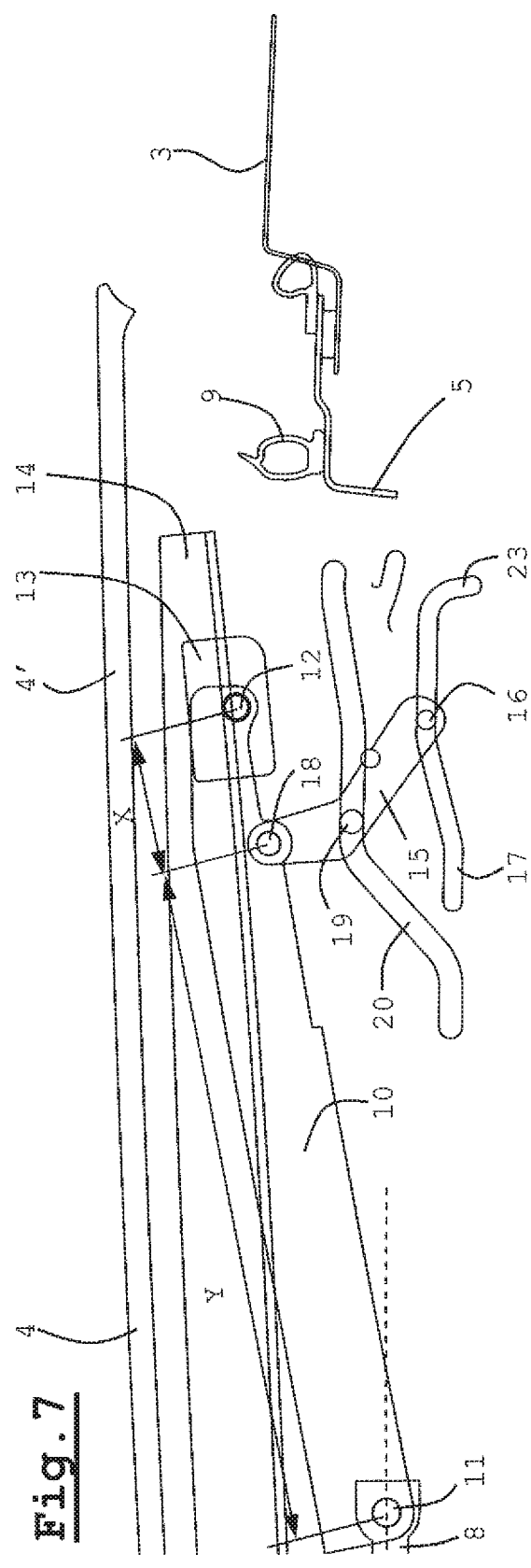

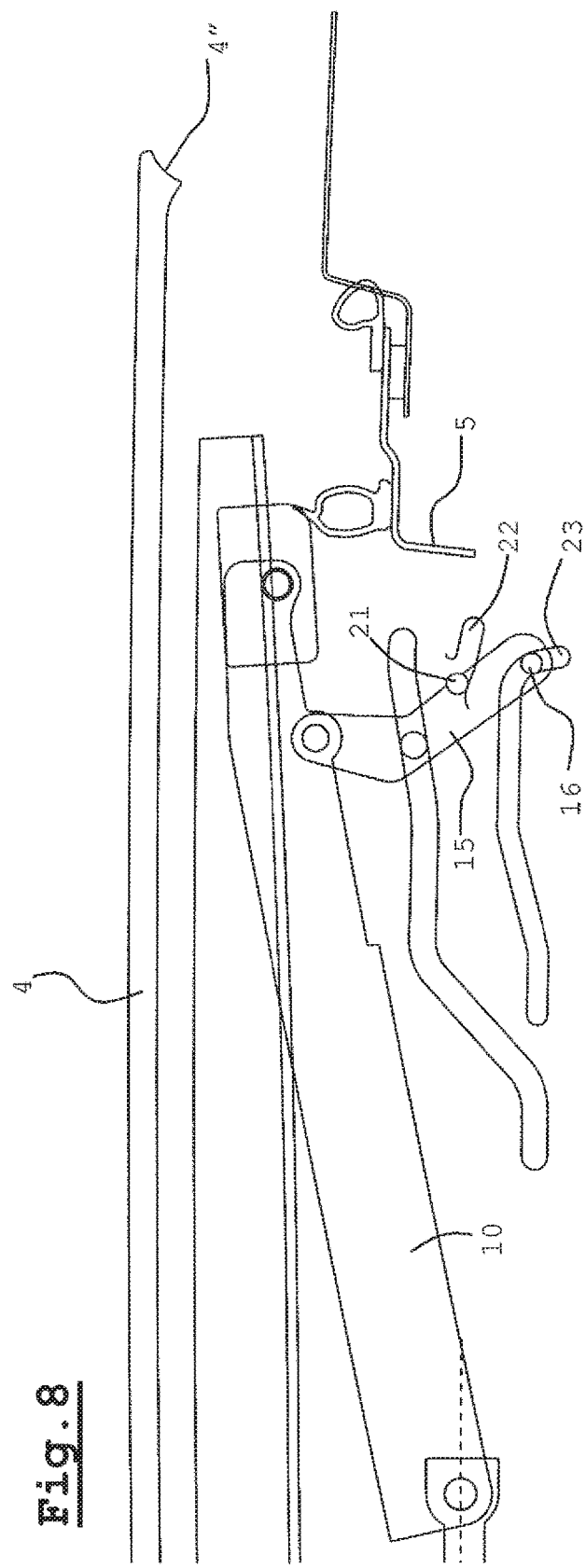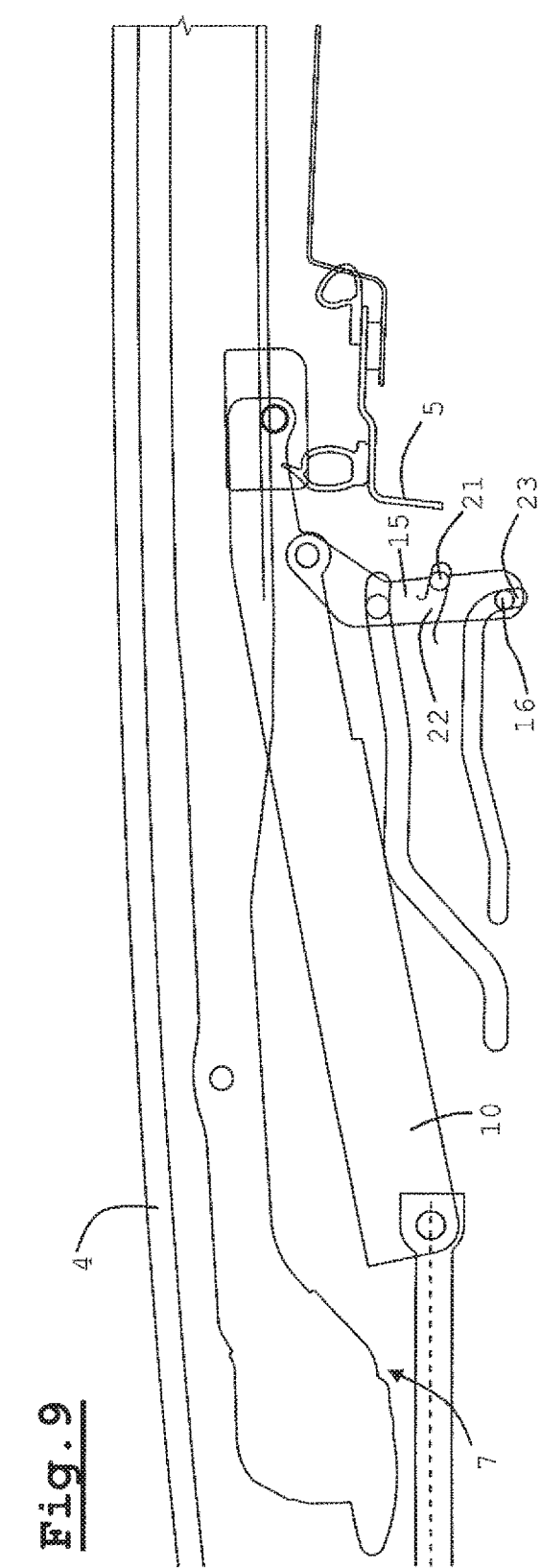

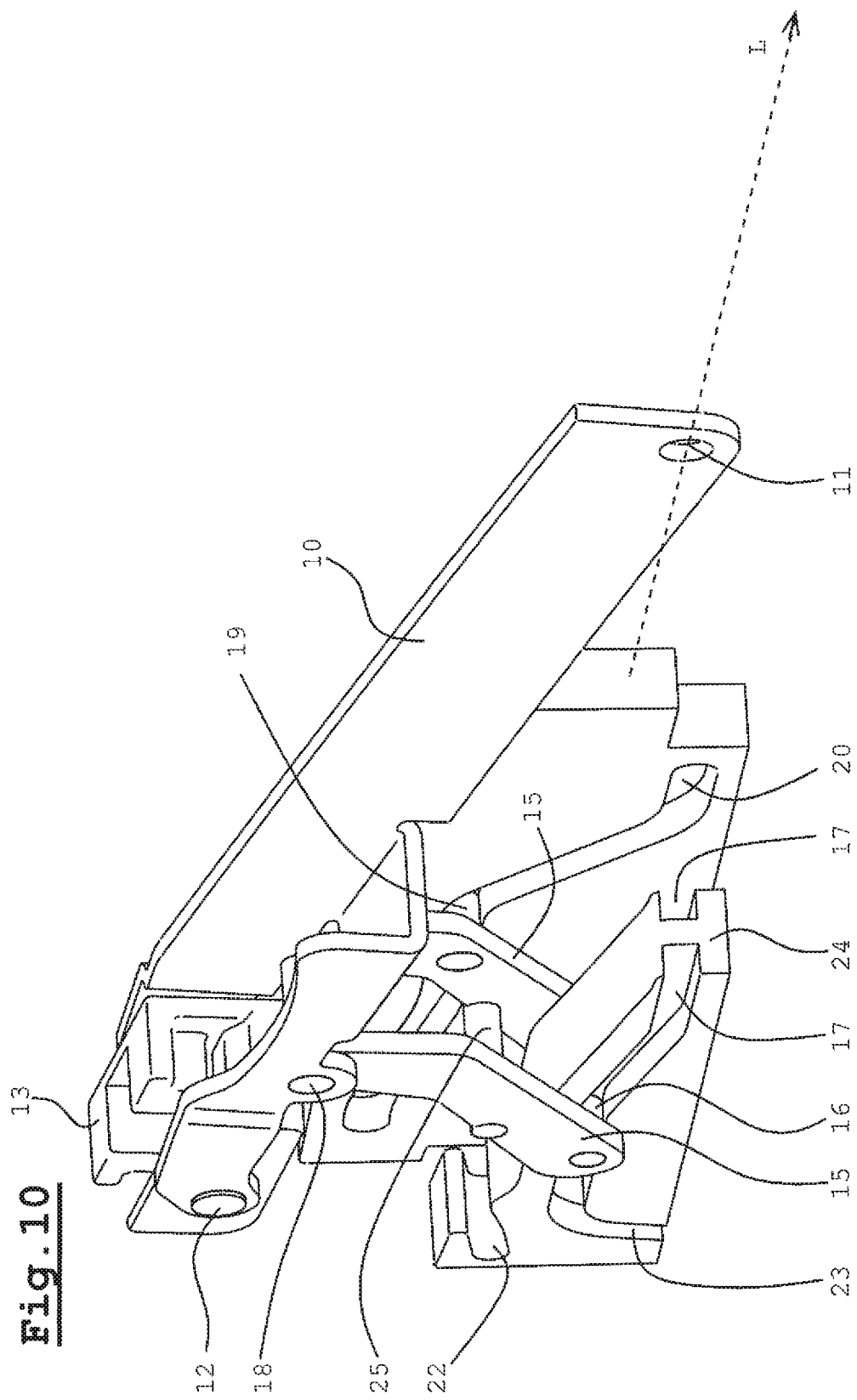

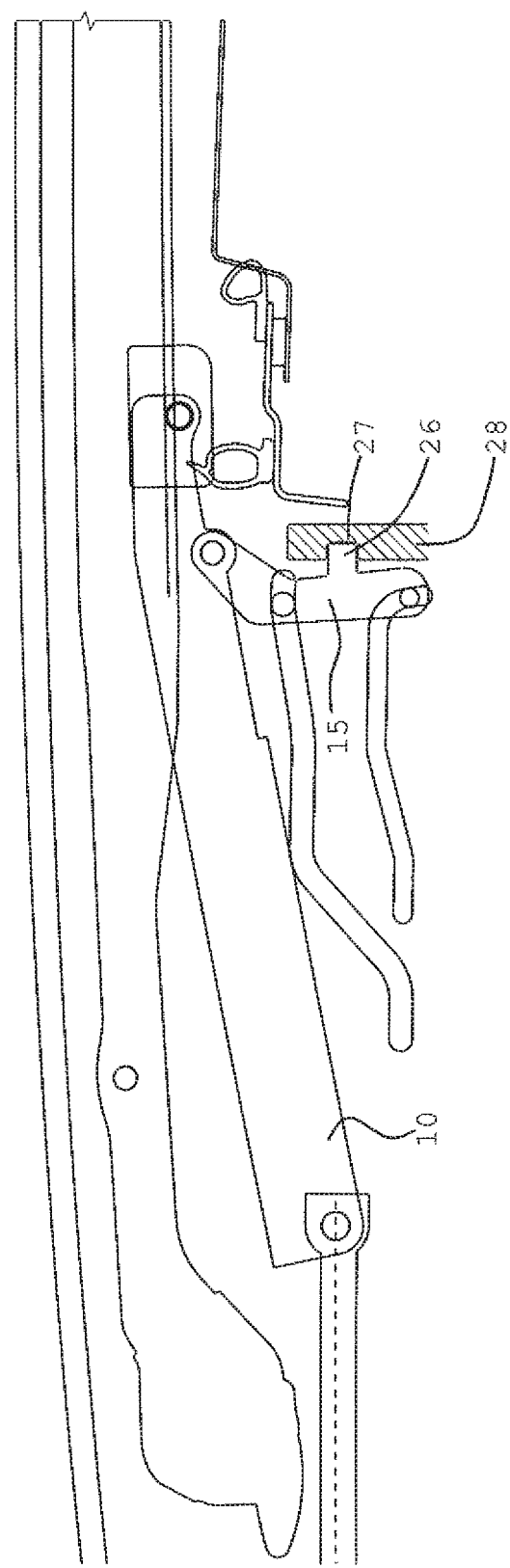

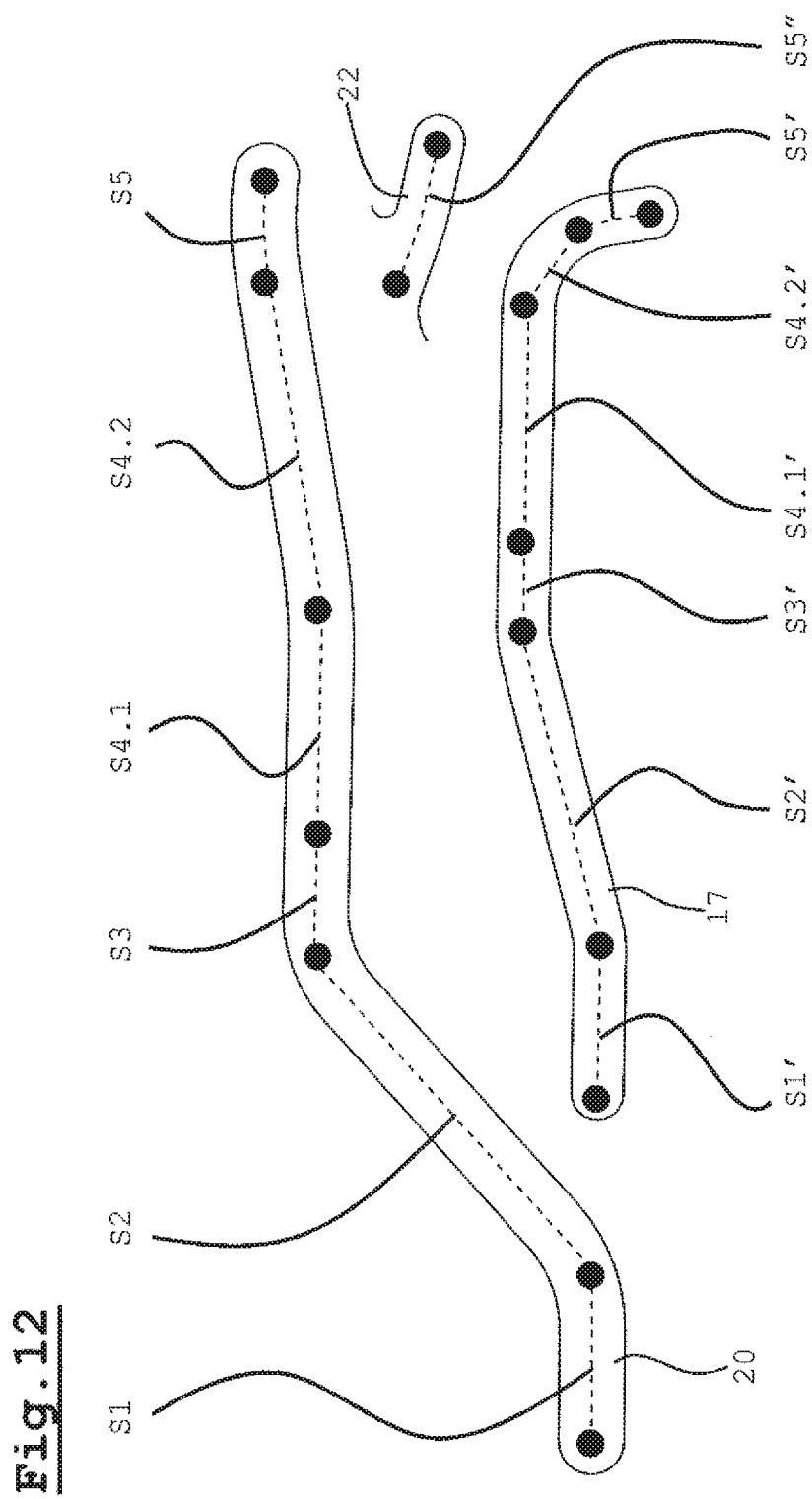

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening defined in a stationary roof part of the vehicle and a panel that is movable between an open position for opening said roof opening and a closed position for fully closing said roof opening. The panel comprises a rear end that, as viewed in a longitudinal direction of the vehicle, can be moved upward and downward by a moving mechanism comprising at least a support lever having a first support lever end which is slidable and rotatable with respect to the stationary roof part and an opposite second support lever end slidably and rotatably engaging the movable panel. A drive slides said first support lever end of the support lever along the stationary roof part, and a tilting lever has a first tilting lever end slidably and rotatably engaging a first guide curve of the stationary roof part and an opposite second tilting lever end configured to rotatably engage the support lever at an engagement location.

Such an open roof construction is known from EP-2.263.897-B1 and comprises a support lever (indicated as "tilting lever") and a tilting lever (indicated as "auxiliary lever"). In a fully open position of the panel the engagement location is positioned substantially vertically below the second end of the support lever ("tilting lever").

In this state of the art such a position of the engagement position is obtained by a downwardly extending part of the support lever which increases the vertical height (the so-called package height) of the construction. Moreover, because the most rearward position of the tilting lever ("auxiliary lever") is limited by the rear edge of the roof opening, also the most rearward position of the second support lever end is limited thereby. In turn, this means that the most rearward position at which a panel in its fully open position can be supported (by said second support lever end) is also limited by the rear edge of the roof opening and as a result this limits the distance over which a panel can be moved to the rear over the stationary roof part without obtaining an unacceptable loss of stability of the panel. However, in modern open roof designs there is a trend towards increasingly larger panels which can be moved to a position with increasingly larger free roof opening in the open position of the panel.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of an open roof construction disclosed herein is that in all positions of the movable panel between and including the open and closed positions the engagement location, as viewed in the longitudinal forward direction of the vehicle, is located in front of the second support lever end.

Especially the fact that the engagement location, as viewed in the longitudinal forward direction of the vehicle, is located in front of the second support lever end in the fully open position of the panel, allows to increase the stability of the panel in such an open position because the second support lever end (which defines the place where the support lever engages, supports and stabilizes the panel) can be moved further to the rear beyond the rear roof opening edge compared to the state of the art. Further, such a position of the engagement location can increase the lifting height of the rear end of the panel compared to the state of the art (in which the engagement location substantially is located vertically below said rear end), or in other words, allows to achieve the required lifting height with a smaller tilting lever (which may limit the package height).

In one embodiment the first support lever end, the second support lever end and the engagement location substantially are located on a straight line.

Such an arrangement allows to further limit the package height, which is especially advantageous in the closed position of the panel, while still the required lifting height can be achieved.

In another embodiment the ratio x/y between the distance x of the second support lever end to the engagement location and the distance y between the engagement location and the first support lever end, both as considered in a direction from the second support lever end towards the first support lever end, is less than 0.9. More specifically said ratio x/y may be less than 0.5, and in a specific embodiment said ratio x/y lies in a range between 0.15 and 0.4 and preferably is close to or about 0.2.

By choosing such a ratio the operation of the open roof construction may be optimized. At one hand it is a desire to move the second support lever end as far as possible beyond the rear edge of the roof opening (increased distance x) for improving the vertical support of the panel due to a support position closer to the center of gravity of the panel while, however, preventing that the second support lever end moves too far to the rear and engages any other part of the open roof construction. Further, one of the conditions governing the choice of distance y is the fact that the first support lever end preferably should be located sufficiently far in front of the first guide curve such that these members will not interfere in a position of the panel in which the support lever does not move anymore.

In one embodiment the tilting lever between its first and second tilting lever ends is provided with a guide pin that cooperates with a second guide curve.

The cooperation between this guide pin and the second guide curve provides an effective way in which the desired movement of the tilting lever, and thus of the panel, can be achieved in a controlled manner. This is important because the panel should move in a very specific way between its closed and open position while obtaining a number of intermediate positions at specific moments (as will be discussed in detail in the description of an embodiment).

In such an embodiment it is conceivable that the first and second guide curves are shaped such that the tilting lever in the closed position of the panel assumes a substantially horizontal position.

Such a substantially horizontal position of the tilting lever allows to minimize the package height in the closed position of the panel.

In such an embodiment it further is possible that the first and second guide curves are shaped such that the tilting lever assumes a substantially vertical position when the support lever has reached its most rearward position.

Such a substantially vertical position combines an optimal use of the length of the tilting lever in obtaining a desired lifting height of the panel rear end with an increase of the stability of the tilting lever and thus of the panel (the latter because gravitational forces will not or hardly lead to forces trying to tilt the tilting lever).

The indication "substantially vertical position" basically means that the tilting lever, starting from its initial position in the closed position of the panel, has tilted over at least 80 degrees, preferably over about 90 degrees.

It is conceivable that the first and second guide curves are shaped such that the tilting lever, starting from its initial position in the closed position of the panel, already has tilted over at least 30 degrees, preferably over at least 45 degrees before the panel has reached its fully open position (but, for example, just a so-called tilt position).

In one embodiment the first guide curve defines an end curve part connecting to a remaining curve part, wherein when the support lever has reached its most rearward position the first tilting lever end is located in said end curve part and wherein said end curve part includes an angle different from zero with the remaining curve part.

The end curve part can further stabilize the position of the tilting lever in the fully open position.

Preferably said end curve part extends substantially vertically.

In another embodiment of the open roof construction two tilting levers are provided engaging opposite sides of the support lever.

The tilting levers may engage the support lever outwardly or inwardly and together can further increase the stability.

In such an embodiment it is conceivable that the two tilting levers are connected by a strut, wherein the stationary roof part is provided with a receiving slot (or opening) for receiving the strut when the support lever has reached its most rearward position. In a specific embodiment the receiving slot extends substantially horizontally.

The cooperation between the receiving slot and strut may further increase the stability.

In an alternative embodiment the two tilting levers each are provided with a projecting part, wherein the stationary roof part is provided with two receiving slots extending substantially horizontally for receiving the respective projecting parts when the support lever has reached its most rearward position.

Depending on the constructional features of the open roof construction, such a design may be advantageous.

It is noted that also when only one tilting lever is provided, it can comprise such a projecting part cooperating with a receiving slot.

It is possible that the two first guide curves of the stationary roof part engaged by the respective first tilting lever ends of the two tilting levers are located between the two tilting levers and are defined in a single locator block (thus limiting the number of parts), but as an alternative it is possible that the two first guide curves of the stationary roof part engaged by the respective first tilting lever ends of the two tilting levers are located outwardly of the two tilting levers and are defined in two different locator blocks (thus creating a free space between the tilting levers which may be used for receiving another part, e.g. the support lever in the closed position of the panel).

BRIEF DESCRIPTION OF THE DRAWING

FIGS. 6-9 on a larger scale and schematically illustrate a rear moving mechanism of the open roof construction of FIGS. 3-5 in four successive positions;

FIG. 10 on a still larger scale and in a schematical perspective view illustrates an alternative embodiment of a rear moving mechanism;

FIG. 11 in a schematical side elevational view illustrates yet another embodiment of a rear moving mechanism, and FIG. 12 illustrates the design of guide curves used in the rear moving mechanism.

DETAILED DESCRIPTION

Figure 1:
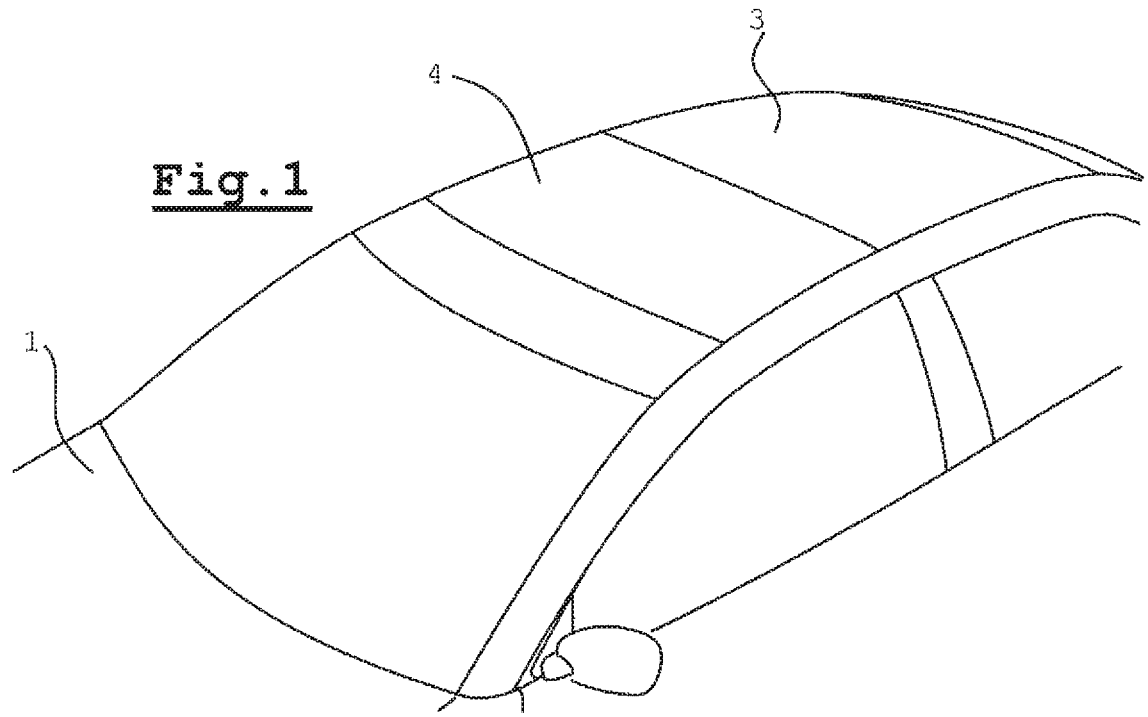
FIGS. 1 and 2 illustrate part of a vehicle with a panel in the closed and open position.
Figure 2:
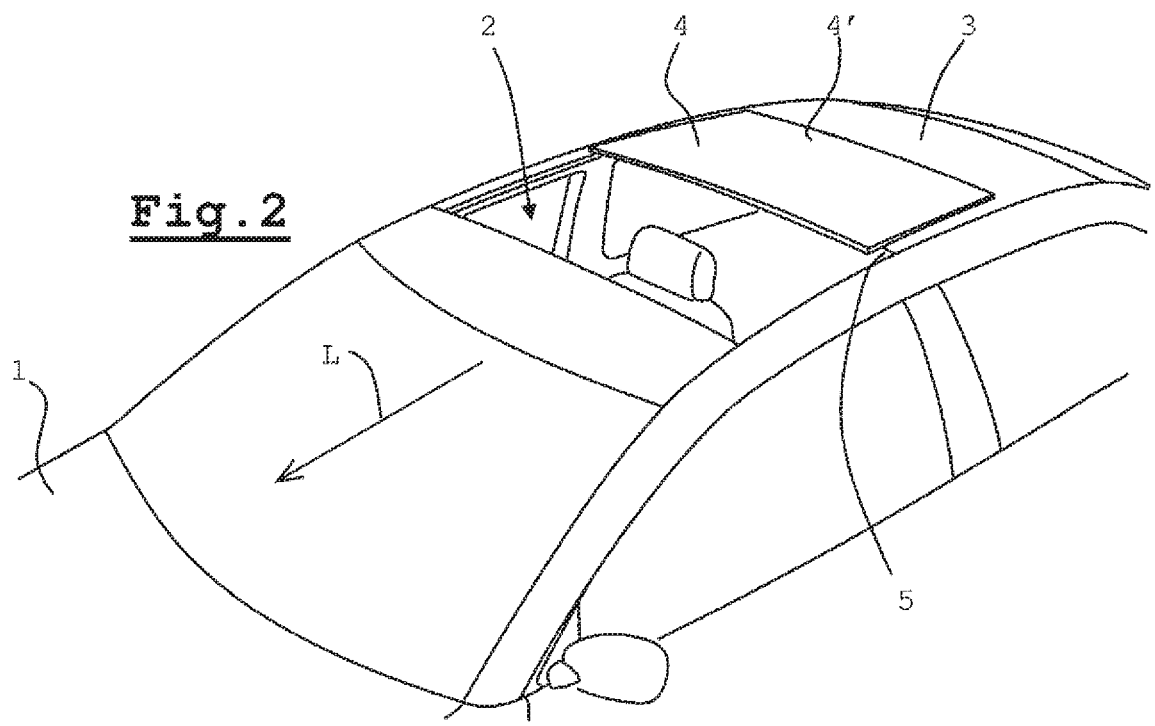

In FIGS. 1 and 2 a general lay-out of an open roof construction for a vehicle 1 is illustrated. The vehicle comprises a roof opening 2 defined in a stationary roof part 3. A panel 4 (for example a glass panel) is provided that is movable between an open position (FIG. 2) for (at least partially) opening said roof opening 2 and a closed position (FIG. 1) for fully closing said roof opening. The panel 4 comprises a rear end 4' that, as viewed in a longitudinal direction L of the vehicle 1, can be moved upward and downward by a rear moving mechanism that will be elucidated below while referring to the FIGS. 3-12).

As appears from FIG. 2, the rear end 4' of the panel 4 is located behind a rear roof opening edge 5 in the open position and one of the objects of the rear moving mechanism is to achieve a stable position of the panel 4 notwithstanding the quite large distance between the rear panel end 4' and the rear roof opening edge 5.

Figure 3:
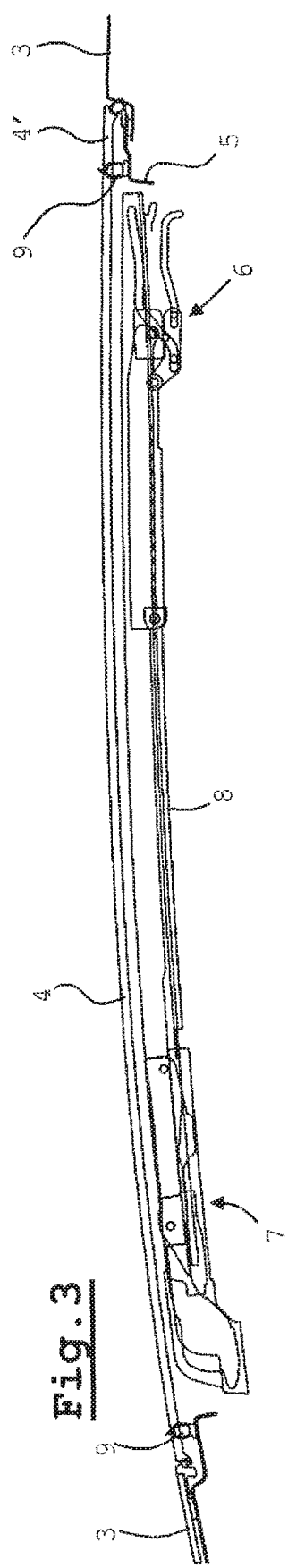
FIGS. 3-5 schematically illustrate an embodiment of the open roof construction in three successive positions.
Figure 4:
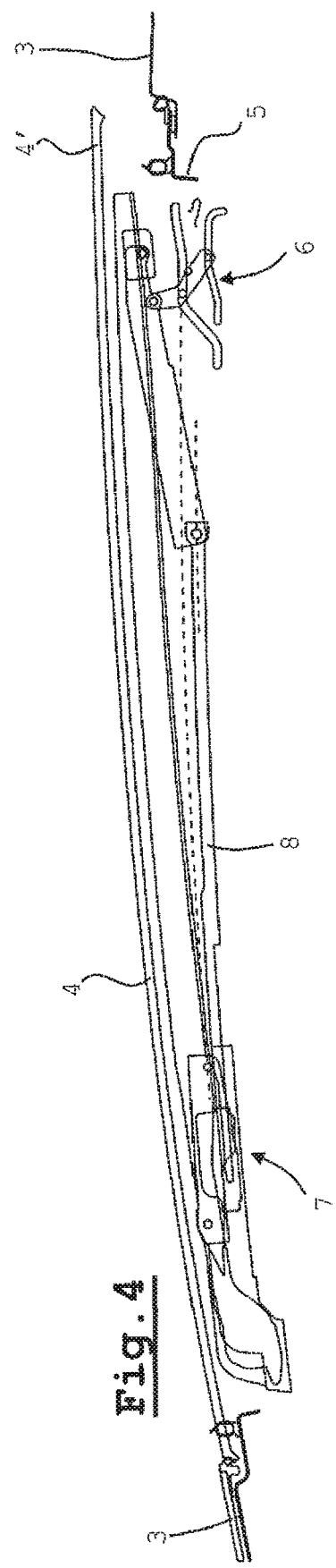
Figure 5:
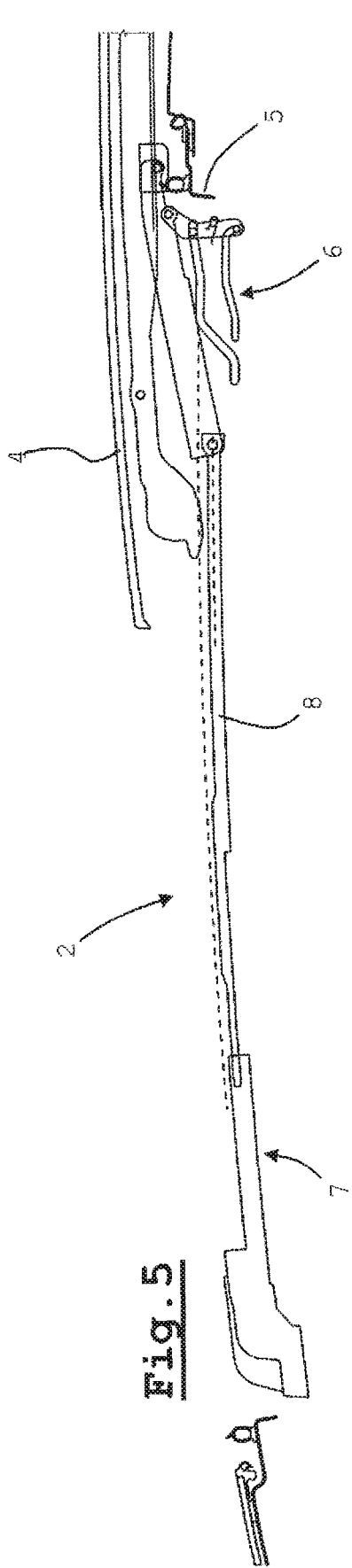

FIGS. 3-5 in an elevational view show a general overview of an embodiment of the open roof construction in three different positions. From these figures it appears that the open roof construction in this embodiment comprises a rear moving mechanism 6 engaging the rear part of the panel 4 as well as a front moving mechanism 7 (of which the details are of no importance for understanding the present invention and thus have not been elucidated) engaging the front part of the panel 4. A drive 8 is provided using which both the rear moving mechanism 6 and front moving mechanism 7 are driven in a synchronized manner. For example such a drive 8 as one of its components may comprise a drive slide cooperating with a push-pull cable, as is common in the field of open roof constructions.

In FIG. 3 the open roof construction is illustrated in a closed position in which the panel fully closes the roof opening 2 (for example by engaging seals 9). When the drive 8 start moving, the panel firstly reaches a so-called tilt position (FIG. 4) in which the rear moving mechanism 6 has lifted the rear part (rear end 4') of the panel 4 while the front part of the panel has not yet (or only in a very limited extent) been moved by the front moving mechanism 7. Next, the front moving mechanism 7 moves the panel 4 backwards, while at the same time the rear moving mechanism 6 further lifts the rear end of the panel 4. The rear moving mechanism 6 is constructed such that it allows the front moving mechanism 7 to slide the panel 4 backwards relative to the rear moving mechanism, such that the panel 4 in the lifted position will slide over the stationary roof part to its fully open position (FIG. 5). It should be noted, however, that the rear moving mechanism 6 itself generally also may or will carry out a limited backward movement.

Next, referring to FIGS. 6-9, details of the rear moving mechanism 6 and its manner of operation will be described. The rear moving mechanism 6 comprises at least a support lever 10 having a first support lever end 11 which is slidable and rotatable with respect to the stationary roof part 3 (and which for example is defined by a slide shoe that, directly or indirectly driven by the drive 8, can move along and rotate within a stationary guide, as is common in this field). An opposite second support lever end 12 is slidable and rotatable with respect to the movable panel 4 (the second support lever end 12 for example may be provided with a so-called wedge 13 that can rotate with respect to the support lever 10 and that can slide along a guide rail 14 that is attached to the panel 4).

The rear moving mechanism 6 further comprises at least one tilting lever 15. This tilting lever has a first tilting lever end 16 which can slide and rotate with respect to a first guide curve 17 of the stationary roof part 3 (the first tilting lever end 16 for example may comprise or may be provided with a guide pin engaging the first guide curve) and an opposite second tilting lever end 18 configured to rotatably engage the support lever 10 at an engagement location (said second tilting lever end 18—which for example may be defined by a hinge pin—and engagement location coincide and thus bear the same reference 18 throughout the figures).

As appears from the FIGS. 6-9, in all positions of the movable panel 4 between and including the open and closed positions the engagement location 18, as viewed in the longitudinal (forward) direction L of the vehicle, is located in front of the second support lever end 12. Moreover, the first support lever end 11, the second support lever end 12 and the engagement location 18 substantially are located on a straight line.

Referring to FIG. 7, the ratio x/y between the distance x of the second support lever end 12 to the engagement location 18 and the distance y between the engagement location 18 and the first support lever end 11, both as considered in a direction from the second support lever end 12 towards the first support lever end 11, is less than 0.9, preferably less than 0.5 and preferably in a range between 0.15 and 0.4. In the illustrated embodiment said ratio is substantially 0.2.

Between its first and second tilting lever ends 16 and 18 the tilting lever 15 is provided with a guide pin 19 that cooperates with a second guide curve 20.

The first and second guide curves 17 and 20 are shaped such that the tilting lever 15 in the closed position of the panel 4 (FIG. 6) assumes a substantially horizontal position, and also such that the tilting lever 15 in an open position of the panel 4 (FIG. 9) assumes a substantially vertical position. The latter open position also may be a not fully open position of the panel. The indication "substantially vertical position" basically means that the tilting lever, starting from its initial position in the closed position of the panel, has tilted over at least 80 degrees, preferably over about 90 degrees.

The tilting lever 15 further comprises a projecting part 21 (for example projecting sideward, that means perpendicularly to the drawing) which when the support lever 10 has moved to its most rearward position (FIG. 9) enters a substantially horizontal receiving slot 22 which may be part of the stationary roof.

As can be seen best in FIGS. 6 and 7, the first guide curve 17 defines an end curve part 23 connecting to the remaining part of the first guide curve, wherein in the fully open position of the panel 4 (FIG. 9) the first tilting lever end 16 is located in said end curve part 23. In the illustrated embodiment said end curve part extends substantially vertically, but said end curve part 23 at least should include such an angle with the remaining curve part that the position of the first tilting lever end 16 is sufficiently stabilised.

Starting from the closed position in FIG. 6, a movement of the first support lever end 11 to the rear of the vehicle 1 (to the right in the figures) successively leads to the positions of the rear moving mechanism 6 and panel 4 illustrated in FIG. 7 (tilt position in which, basically, only the rear part 4' of the panel 4 has been lifted), the position in FIG. 8 (slide-lift position in which the panel 4 has slightly shifted to the rear, such that its extreme rear edge 4" is located further rearward of the rear roof opening edge 5, in which the projecting part 21 has reached the beginning of the receiving slot 22 and in which the first tilting lever end 16 just has entered the beginning of the end curve part 23), and finally FIG. 9 (slide-open position in which the tilting lever 15 has reached its final position in which the projecting part 21 has fully entered the receiving slot 22, the first tilting lever end 16 has fully entered the end curve part 23 and in which the panel 4 has reached its extreme rear, fully open position in which also the forward moving mechanism 7 has fully moved to the rear).

Figure 13:
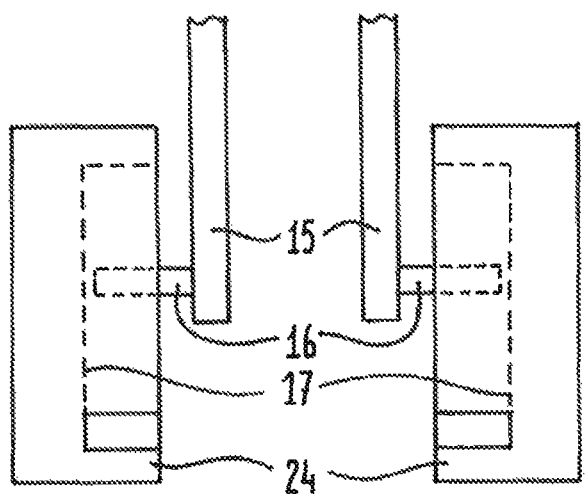
FIG. 13 illustrates yet another embodiment of a rear moving mechanism.

The embodiment illustrated in FIG. 10 features two tilting levers 15. In this embodiment the respective first guide curves 17 are located inwardly of the tilting levers 15 and are integrated into a single locator block 24, but it is also conceivable (as illustrated in FIG. 13) that the guide pins defining the first tilting lever ends 16 face outwardly for engaging respective, first guide curves 17 located outwardly of the tilting levers 15 and defined in two separate locator blocks 24.

Further the two tilting levers 15 are connected by a strut 25, wherein the stationary roof part is provided with a receiving slot 22 for receiving the strut when the support lever 10 has reached its most rearward position.

In this embodiment only one tilting lever 15 is provided with a guide pin 19 cooperating with a second guide curve 20. In an alternative embodiment (not illustrated) however, both tilting levers 15 comprise such a guide pin 19 cooperating with a second guide curve 20.

In FIG. 11 an alternative embodiment is illustrated in which a projecting part 26 has taken the place of projecting part 21. This projecting part 26 on the tilting lever 15 is receivable in an opening (or receiving slot) 27 in a stationary part 28 of the open roof construction. Such a projecting part 26 also may be provided in the event of the provision of two tilting levers 15, such that the strut 25 then may be omitted to provide a free space between the tilting levers 15 (for example for receiving the support lever 10 in the closed position, in which event in FIG. 10 the upper, second tilting lever ends 18 should be located at the outside of the support lever 10, and not at the inner side as illustrated). Thus, in such a case both tilting levers 15 are provided with an own projecting part 26 receivable in a dedicated receiving slot 27 and, then, in FIG. 11 the tilting lever 15 illustrated may be considered to represent either one of the two tilting levers 15.

Finally reference is made to FIG. 12 which illustrates the first and second guide curves 17 and 20 as well as the receiving slot 22. Successive sections of the guide curves, separated by black circles, have been indicated.

In the closed position of the panel 4 the guide pin 19 is located in horizontal section S1 of second guide curve 20 and the first tilting lever end 16 is located in horizontal section S1' of the first guide curve 17. This provides sufficient support in a vertical direction for preventing a lifting of the panel 4 (due to a suction force while driving the vehicle or during an attempt of burglary). In this position the guide pin 19 should be located as close as possible to the second tilting lever end 18 for minimising any moments acting on the tilting lever 15.

During the movement to tilt, the guide pin 19 moves up along section S2 of the second guide curve 20, whereas the first tilting lever end 16 moves slightly up along section S2' of the first guide curve 17 (such that the first tilting lever end 16 later can move down again into end curve part 23). This minimizes the package height.

Horizontal sections S3 and S3' at one hand serve for offering sufficient vertical support and at the other hand are intended for coping with tolerances (for example in components of the drive 8).

When the guide pin 19 and the first tilting lever end 16 are in sections S4.1 and S4.1' the support lever 10 is moved to the rear for moving the wedge 13 beyond the rear edge 5 of the roof opening 2.

In sections S4.2 and S4.2' the support lever 10 is moved further to the rear while slightly moving up for arriving at the correct dimension of the opening, whereas the tilting lever 15 already is moving to its locked position in the end curve part 23.

Finally, in sections S5 and S5' the guide pin 19 is again positioned in a horizontal part of the first guide curve 17 for offering sufficient vertical support to the panel 4 in its fully open position (the guide pin 19 should be closely enclosed or supported (with as little play as possible) at its upper and lower side by the second guide curve 20 for avoiding vertical vibrations of the panel), and the first tilting lever end 16 has reached its end position in the (substantially) vertically oriented end curve part 23 (in which it likewise should be enclosed closely for avoiding horizontal vibrations). The projecting part 21 or strut 25 has entered the receiving slot 22 (here also indicated as section S5") which offers additional vertical support.

The invention is not limited to the embodiments described before which may be varied widely within the scope of the invention as defined by the appending claims.

The invention claimed is:

1. An open roof construction for a vehicle, comprising:
   a roof opening defined in a stationary roof part of the vehicle, the stationary roof part having a first guide curve;
   a panel movable between an open position for opening said roof opening and a closed position for fully closing said roof opening;
   a moving mechanism configured to move a rear end, as viewed in a longitudinal direction of the vehicle, of the panel upward and downward, the moving mechanism comprising at least a support lever having a first support lever end which is slidable and rotatable with respect to the stationary roof part and an opposite second support lever end slidably and rotatably engaging the movable panel;
   a drive configured to slide said first support lever end of the support lever along the stationary roof part; and
   a tilting lever having a first tilting lever end slidably and rotatably engaging the first guide curve of the stationary roof part and an opposite second tilting lever end configured to rotatably engage the support lever at an engagement location, wherein in all positions of the movable panel between and including the open and closed positions, the engagement location, as viewed in a longitudinal forward direction of the vehicle, is located in front of the second support lever end.

2. The open roof construction according to claim 1, wherein the first support lever end, the second support lever end and the engagement location substantially are located on a straight line.

3. The open roof construction according to claim 1, wherein a ratio x/y between a distance x of the second support lever end to the engagement location and a distance y between the engagement location and the first support lever end, both as considered in a direction from the second support lever end towards the first support lever end, is less than 0.9.

4. The open roof construction according to claim 3, wherein said ratio x/y is less than 0.5.

5. The open roof construction according to claim 4, wherein said ratio x/y lies in a range between 0.15 and 0.4.

6. The open roof construction of claim 5 wherein said ratio x/y is about 0.2.

7. The open roof construction according to claim 1, wherein the tilting lever between its first and second tilting lever ends is provided with a guide pin that cooperates with a second guide curve.

8. The open roof construction according to claim 7, wherein the first and second guide curves are shaped such that the tilting lever in the closed position of the panel assumes a substantially horizontal position.

9. The open roof construction according to claim 7, wherein the first and second guide curves are shaped such that the tilting lever assumes a substantially vertical position when the support lever has reached its most rearward position.

10. The open roof construction according to claim 9, wherein the first and second guide curves are shaped such that the tilting lever, starting from its initial position in the closed position of the panel, already has tilted over at least 30 degrees before the panel has reached its fully open position.

11. The open roof construction according to claim 9, wherein the first and second guide curves are shaped such that the tilting lever, starting from its initial position in the closed position of the panel, already has tilted over at least 45 degrees before the panel has reached its fully open position.

12. The open roof construction according to claim 9, wherein the first guide curve defines an end curve part connecting to a remaining curve part, wherein when the support lever has reached its most rearward position the first tilting lever end is located in said end curve part and wherein said end curve part includes an angle different from zero with the remaining curve part.

13. The open roof construction according to claim 12, wherein said end curve part extends substantially vertically.

14. The open roof construction according to claim 1, wherein the tilting lever and a second tilting lever engage opposite sides of the support lever and wherein the second tilting lever has a first tilting lever end slidably and rotatably engaging an additional first guide curve of the stationary roof part.

15. The open roof construction according to claim 14, wherein the tilting lever and the second tilting lever are connected by a strut and wherein the stationary roof part is provided with a receiving slot configured to receive the strut when the support lever has reached its most rearward position.

16. The open roof construction according to claim 15, wherein the receiving slot extends substantially horizontally.

17. The open roof construction according to claim 14, wherein the tilting lever and the second tilting lever each are provided with a projecting part and wherein the stationary roof part is provided with two receiving slots extending substantially horizontally for receiving the respective projecting parts when the support lever has reached its most rearward position.

18. The open roof construction according to claim 14, wherein the first guide curve and the additional first guide curve of the stationary roof part engaged by the respective first tilting lever ends of the tilting lever and the second tilting lever are located between the tilting lever and the second tilting lever and are defined in a single locator block.

19. The open roof construction according to claim 14, wherein the first guide curve and the additional guide curve of the stationary roof part engaged by the respective first tilting lever ends of the tilting lever and the second tilting lever are located outwardly of the tilting lever and the second tilting lever and are defined in two different locator blocks.

* * * * *